United States Patent
Rosler et al.

(10) Patent No.: US 11,580,419 B2
(45) Date of Patent: Feb. 14, 2023

(54) COMPUTER ENVIRONMENT INFRASTRUCTURE COMPLIANCE AUDIT RESULT PREDICTION

(71) Applicant: KYNDRYL, INC., New York, NY (US)

(72) Inventors: Adan Rosler, São Paulo (BR); Andre L. Soares, Sao Jose do Rio Preto (BR)

(73) Assignee: Kyndryl, Inc., New York, NY (US)

( * ) Notice: Subject to any disclaimer, the term of this patent is extended or adjusted under 35 U.S.C. 154(b) by 1308 days.

(21) Appl. No.: 15/983,151

(22) Filed: May 18, 2018

(65) Prior Publication Data

US 2019/0354881 A1  Nov. 21, 2019

(51) Int. Cl.
  *G06N 5/04*  (2006.01)
  *G06F 21/57*  (2013.01)
  *G06N 20/00*  (2019.01)

(52) U.S. Cl.
  CPC ............ *G06N 5/04* (2013.01); *G06F 21/577* (2013.01); *G06N 20/00* (2019.01); *G06F 2221/034* (2013.01)

(58) Field of Classification Search
  CPC ... G06F 21/577; G06F 2221/034; G06N 5/04; G06N 20/00
  See application file for complete search history.

(56) References Cited

U.S. PATENT DOCUMENTS 9,065,746 B2  6/2015  Dolinsky et al.
9,246,752 B2  1/2016  Holst et al.
2005/0102534 A1  5/2005  Wong
2011/0112973 A1  5/2011  Sanghvi
2011/0119107 A1  5/2011  King
2012/0102543 A1  4/2012  Kohli et al.
(Continued)

FOREIGN PATENT DOCUMENTS

CN  102427445 A  4/2012
CN  106096657 A  11/2016
(Continued)

OTHER PUBLICATIONS

"IT Infrastructure Audit, Assessment & Assurance Services", http://netcon.in/it_audit.php, netcon, 2016, 2 pgs.
(Continued)

*Primary Examiner* — Azizul Choudhury
(74) *Attorney, Agent, or Firm* — John Kennel; Matthew M. Hulihan; Heslin Rothenberg Farley & Mesiti PC

(57) ABSTRACT

Computer environment infrastructure compliance audit result prediction includes receiving system inventory information identifying systems of a computer environment and properties of those systems, loading security requirements applicable to systems, determining compliance deviations indicating deviations between current configurations of the systems and the security requirements, based at least on the determined compliance deviations, selecting audit features based on which a predicted audit result is to be generated, and generating a predicted audit result using the selected audit features as input to an audit result classification model trained on historical audit information to predict audit results based on input audit features, and the predicted audit result being a prediction of a result of an audit of the systems.

20 Claims, 11 Drawing Sheets

(56) References Cited

U.S. PATENT DOCUMENTS

| | | | |
|---|---|---|---|
| 2013/0031037 A1* | 1/2013 | Brandt | H04L 63/1408 706/12 |
| 2013/0311387 A1 | 11/2013 | Schmerler | |
| 2015/0281277 A1* | 10/2015 | May | H04L 63/10 726/1 |

FOREIGN PATENT DOCUMENTS

| | | | |
|---|---|---|---|
| WO | 2016145089 A1 | 9/2016 | |
| WO | 2017093806 A2 | 6/2017 | |

OTHER PUBLICATIONS

"GRC Software", http://aponia.co/grc-software/, Aponia, 4 pgs.
Mell, Peter, et al., "The NIST Definition of Cloud Computing", NIST Special Publication 800-145, Sep. 2011, Gaithersburg, MD, 7 pgs.

* cited by examiner

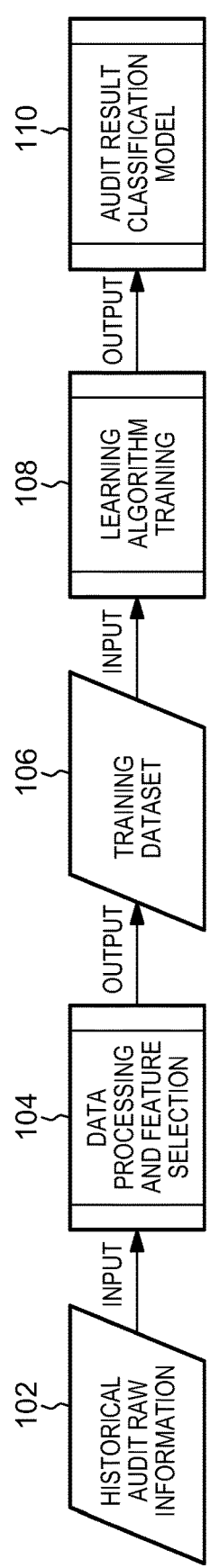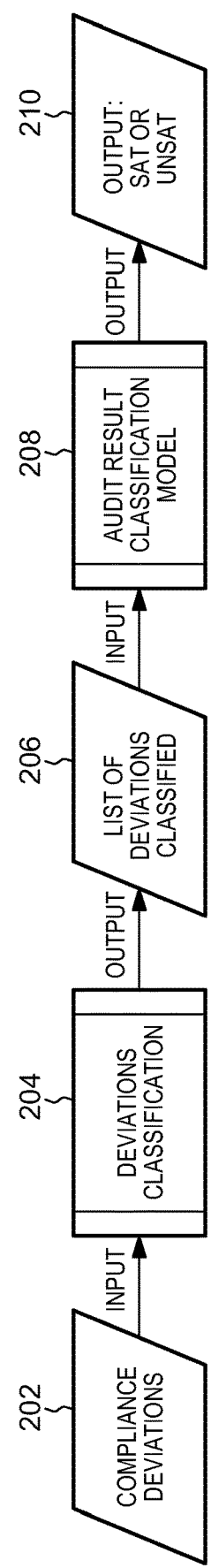

COMPUTER ENVIRONMENT INFRASTRUCTURE COMPLIANCE AUDIT RESULT PREDICTION

BACKGROUND

Many computer environments are subject to requirements designed to ensure the integrity and security of the environment's systems and other assets. Audits are typically performed on the environment and its component systems to determine whether the systems or the environment generally are in compliance with the particular security requirements applicable thereto. Most audits examine hundreds or thousands of audit points, though often times the primary focus of the auditee is the ultimate result—whether the audit 'passes' or 'fails'.

SUMMARY

Shortcomings of the prior art are overcome and additional advantages are provided through the provision of a computer-implemented method. The method receives system inventory information identifying systems of a computer environment and properties of the systems. The systems are targeted for audit result prediction. The method loads security requirements applicable to the plurality of systems. The method determines compliance deviations based on the received system inventory information and the loaded security requirements. Each compliance deviation of the compliance deviations indicates a deviation between a current configuration of a respective one or more systems of the systems and a respective security requirement, of the security requirements, applicable to the one or more systems. The method also, based at least on the determined compliance deviations, selects a set of audit features based on which a predicted audit result is to be generated. The method generates a predicted audit result using the selected set of audit features as input to an audit result classification model. The audit result classification model is trained on historical audit information to predict audit results based on input audit features. The predicted audit result is a prediction of a result of an audit of the systems.

Further, a computer system is provided that includes a memory and a processor in communication with the memory, wherein the computer system is configured to perform a method. The method receives system inventory information identifying systems of a computer environment and properties of the systems. The systems are targeted for audit result prediction. The method loads security requirements applicable to the plurality of systems. The method determines compliance deviations based on the received system inventory information and the loaded security requirements. Each compliance deviation of the compliance deviations indicates a deviation between a current configuration of a respective one or more systems of the systems and a respective security requirement, of the security requirements, applicable to the one or more systems. The method also, based at least on the determined compliance deviations, selects a set of audit features based on which a predicted audit result is to be generated. The method generates a predicted audit result using the selected set of audit features as input to an audit result classification model. The audit result classification model is trained on historical audit information to predict audit results based on input audit features. The predicted audit result is a prediction of a result of an audit of the systems.

Yet further, a computer program product including a computer readable storage medium readable by a processing circuit and storing instructions for execution by the processing circuit is provided for performing a method. The method receives system inventory information identifying systems of a computer environment and properties of the systems. The systems are targeted for audit result prediction. The method loads security requirements applicable to the plurality of systems. The method determines compliance deviations based on the received system inventory information and the loaded security requirements. Each compliance deviation of the compliance deviations indicates a deviation between a current configuration of a respective one or more systems of the systems and a respective security requirement, of the security requirements, applicable to the one or more systems. The method also, based at least on the determined compliance deviations, selects a set of audit features based on which a predicted audit result is to be generated. The method generates a predicted audit result using the selected set of audit features as input to an audit result classification model. The audit result classification model is trained on historical audit information to predict audit results based on input audit features. The predicted audit result is a prediction of a result of an audit of the systems.

Additional features and advantages are realized through the concepts described herein.

BRIEF DESCRIPTION OF THE DRAWINGS

Aspects described herein are particularly pointed out and distinctly claimed as examples in the claims at the conclusion of the specification. The foregoing and other objects, features, and advantages of the invention are apparent from the following detailed description taken in conjunction with the accompanying drawings in which:

FIG. 1 depicts an overview of a machine learning model creation process in accordance with aspects described herein;

FIG. 2 depicts an overview of an audit result prediction process in accordance with aspects described herein;

DETAILED DESCRIPTION

Figure 3:
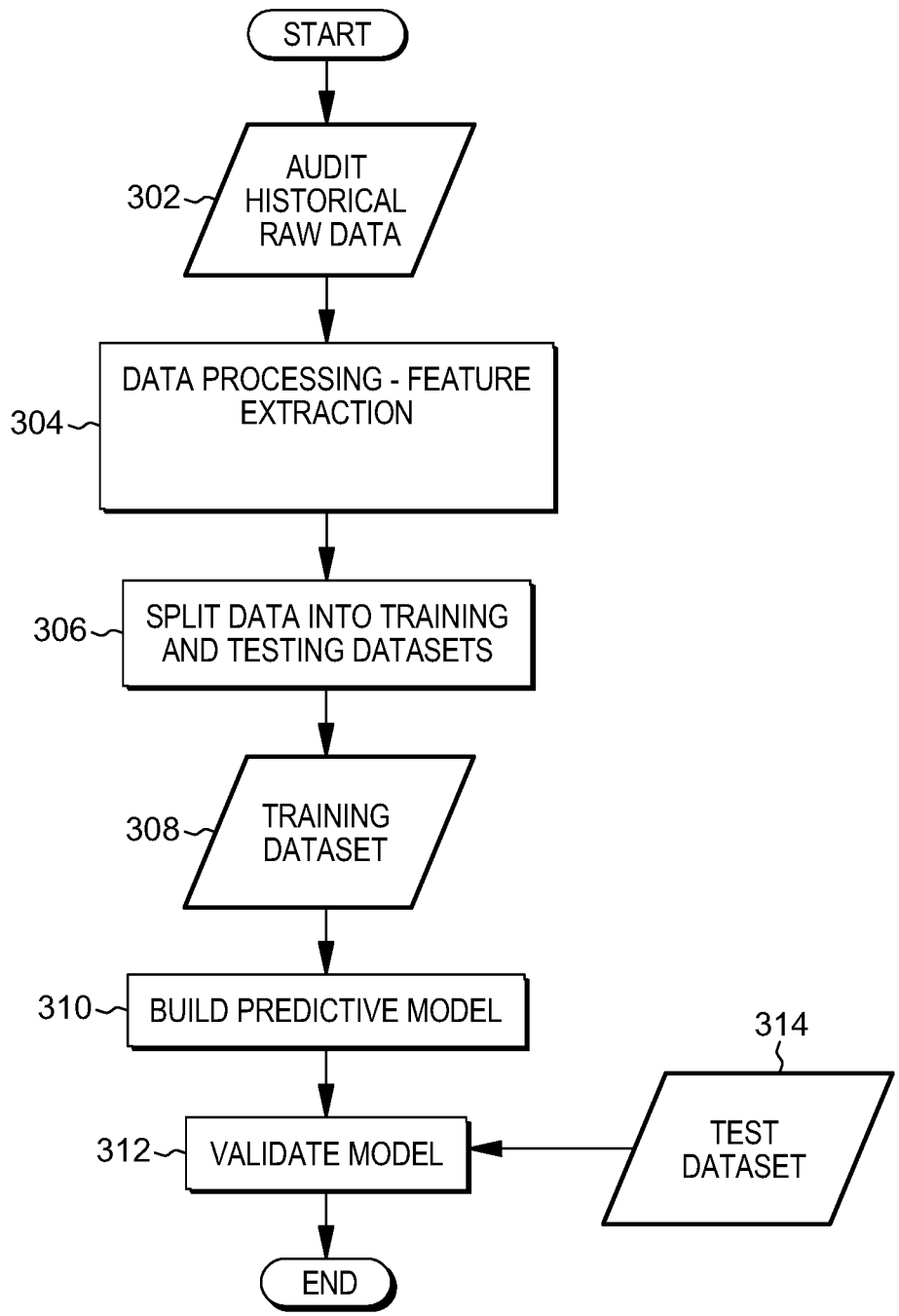
FIG. 3 depicts an example machine learning process for creation of a prediction model, in accordance with aspects described herein.

Even though the organization may be aware of the security requirements on which it will be audited and may understand what it theoretically takes to 'pass' each of those requirements, it nevertheless may be difficult to understand in practice what constitutes deviations from the requirements and whether/how they will affect whether the audit passes or fails. Even the presence of objectively identifiable deviations from security requirements is not necessarily telling of whether an audit passes or fails, since discretion, human error, and other variables can factor into an auditor's final decision.

Approaches described herein leverage a machine learning model trained based on how audit risk is historically evaluated. The model is applied to predict a result of an audit of a given computing environment subject to applicable security requirements. Aspects are presented in two parts, in particular (i) the creation of a learning model used to predict audit results and (ii) the use of the learning model in the prediction of audit results.

Referring initially to FIG. 1, which depicts an overview of a machine learning model creation process in accordance with aspects described herein, the process takes as an input raw data/information of historical audits (102). This information refers to information of prior-conducted audits, and their results. It may be consolidated into a single dataset, having, e.g., details about audit findings, audited environments, audit data, and the audit results (e.g. PASS, FAIL, SATISFACTORY, UNSATISFACTORY), and/or any other desired audit information, as examples.

The historical information is fed as input to a data processing and feature selection component (104) that identifies the meaningful features (variables, attributes) and transforms them into a training dataset (106). The training dataset 106 is fed as input to learning algorithm training (108), in which a learning algorithm uses the training dataset to produce a classification model trained to predict audit results. This classification model is output as an Audit Result Classification Model (110) configured/trained to predict audit results based on the knowledge created from the training data.

FIG. 2 depicts an overview of an audit result prediction process in accordance with aspects described herein. Generally, the process collects and processes current system information of a subject computer environment and feeds it into the trained audit result classification model to generate an output that is a prediction of the result of an audit, if conducted, against the subject computer environment.

The process obtains compliance deviations (202) as input. A compliance deviation is a deviation between a security requirement and a current configuration of system(s) or process execution, of the environment, to which the security requirement is applicable. The process classifies these deviations (204) according to a set of categories, each having a weight associated therewith. By way of example, for a category of Asset Importance, a production system is likely to have a higher weight than a testing system, since production systems tend to service legitimate workloads while testing systems are typically not used in production. Classifying these deviations generates a list of classified deviations (206). In a particular embodiment, the list indicates each of the deviations and the classification applied, e.g. the severity of each. Each deviation is assigned a severity score based on the deviation characteristics and weight.

The list is provided as input to the audit result classification model (208) trained on previous audit data, which predicts an audit result, i.e. whether the environment would pass or fail if an audit against the security requirements were conducted. This result is then output—in this example as an indication of SAT (satisfactory) or UNSAT (unsatisfactory).

Further details are now provided about aspects presented above. FIG. 3 depicts an example machine learning process for creation of a prediction model, in accordance with aspects described herein. This is just one example machine learning process to build an audit result classification model using a machine learning algorithm; many other approaches may be used. The example of FIG. 3 presents the key steps in creating such a prediction model. In one example, the process is performed by a computer system as described herein.

The process obtains historic audit information (302), that is, raw information/data of historic audits. Feature extraction is performed against the data to extract a set of features from the historical raw data to a dataset that is split into a training dataset and a test dataset (304). In a particular example, for each audit represented in the historical audit information, at least the following features are selected from the historical audit information: an audit result, a number of compliance deviations, a severity of each of the compliance deviations, and an environment size. Other features are possible. In some embodiments, one or more of the following are collected as part of the historic audit information:

Audit Result (e.g. 'Satisfied' or 'Unsatisfied');
Number of deviations found during the audit;
Severity of the deviations found during the audit;
Size of the environment (referring to the universe or scope of the audit. The size typically depends on what the audit is intended for. Example sizes include the number of operating systems involved, number of servers, number of applications, or the like. The universe/size is typically context dependent.);
Size of the samples used by the auditors during the audit;
Name of the environment;
Date when the audit was executed/performed; and/or
Type of the audit.

The process of FIG. 3 continues by splitting/partitioning (306) the data into training dataset (308) and test dataset (314). The selected features are split into training and test datasets in order to test the accuracy of the model after it is built and trained. The model is trained on different data against which it is tested.

The training dataset (308) is used to build the predictive mode (310), for instance used as input to a learning algorithm in order to create a predictive model trained to predict an audit result (e.g. SAT or UNSAT), i.e. whether the environment would pass or fail in an audit against the security requirements applicable to it. Thus, the training dataset is input into a learning algorithm that performs classification on the training dataset, the classification to extract features that are indicative of audit results, and generates the audit result classification model based on the inputting. The process validates the generated model (312) by testing it against the test dataset (314) to validate the model's accuracy in predicting audit results. The test dataset, being historic audit data, includes actual results of the audits. These are compared with the result (prediction)

output from the model to determine the accuracy of the model. The output after validating the model is a built audit result classification model.

Audit result prediction is provided by way of the audit result classification model. In an example process, a set of information including indications of compliance deviations and the environment characteristics is provided and processed by the model, which outputs a prediction about the expected audit result.

Figure 4:
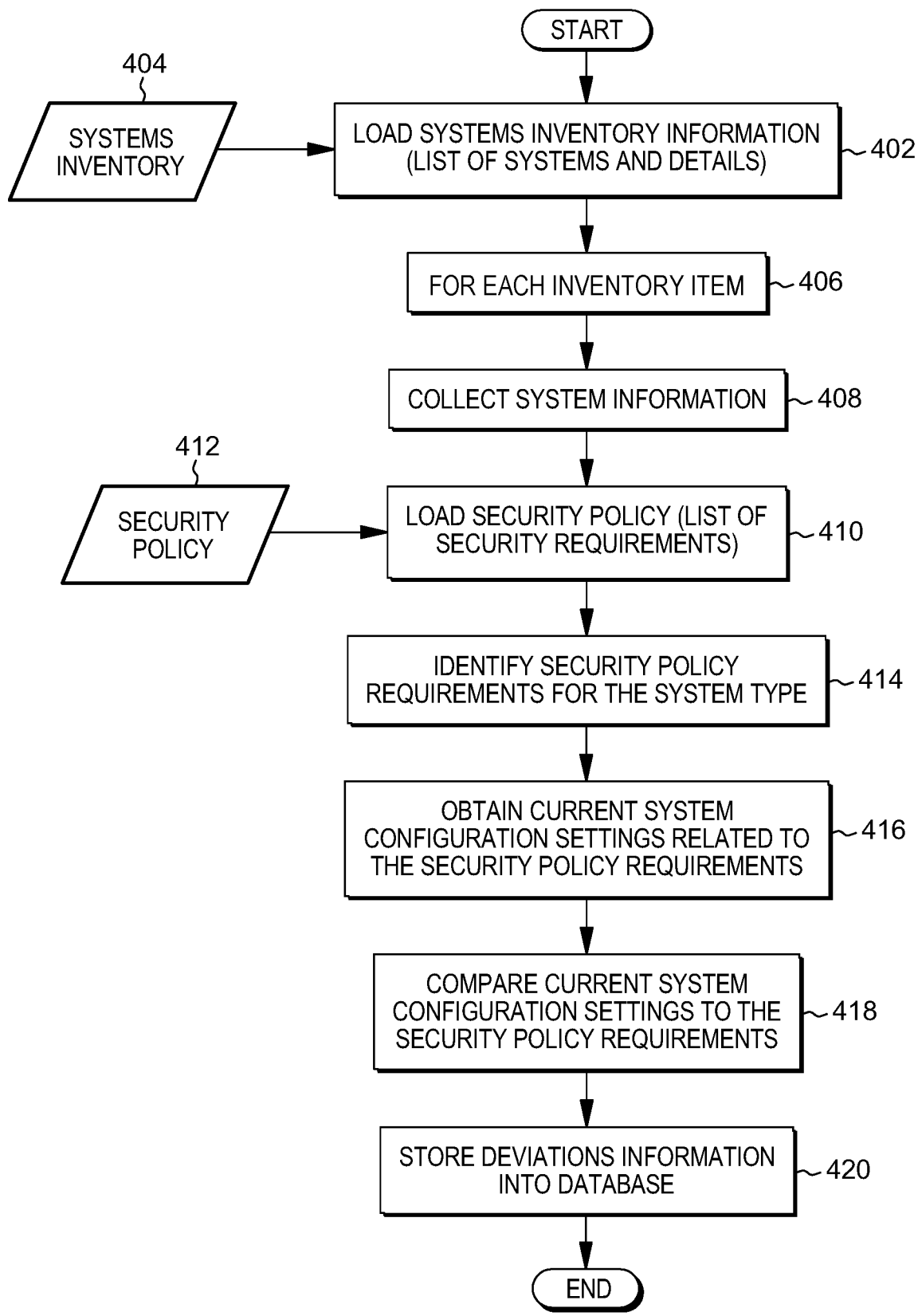
FIG. 4 depicts an example process for determining compliance deviations, in accordance with aspects described herein.

FIG. 4 depicts an example process for determining compliance deviations, in accordance with aspects described herein. The process describes how current system information is gathered and compared against the security requirements in order to identify the existent deviations.

The process begins with loading (402) system inventory information (404), which identifies systems of a computer environment and properties of those systems. These are the systems that are targeted for audit result prediction, e.g. a list of all systems belonging to the universe of systems to be audited. The list can contain detailed information about each system, such as its type (e.g. production, test, development), model, version, release date and other identification details.

The process continues with several aspects for each inventory item (406), e.g. each system in the inventory. It collects the system information (408), such as type, version, etc., and loads (410) the security requirements applicable thereto, which are defined in security policies (412). These requirements are usually proper system values and configurations that will be compared with the current system values. The process identifies the security policy requirements for the system type (414) and obtains current system configuration settings related to the security policy requirements (416). It compares the current system configuration settings to the security policy requirements (418). Every requirement is verified and in case the system is not properly configured, a deviation is found. The then process stores the deviation information into a database (420) along with any desirable details.

Accordingly, the process determines compliance deviations based on the received system inventory information and the loaded security requirements. Each compliance deviation indicates a deviation between a current configuration of one (or more) of the systems of the inventory and a respective security requirement applicable to the system(s).

Figure 5:
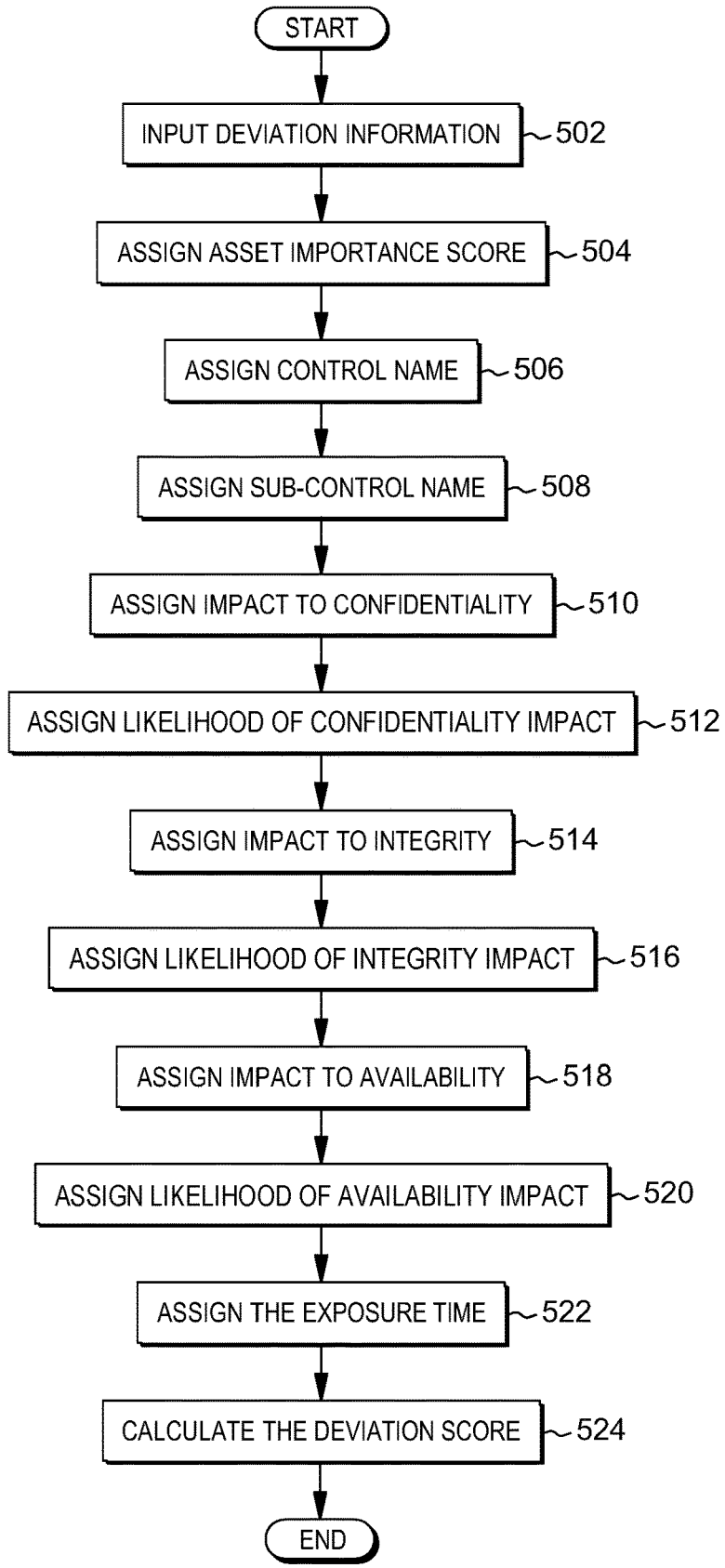
FIG. 5 depicts an example process for classifying a compliance deviation, in accordance with aspects described herein.

Once the deviations are identified, they are then classified. The classification is designed to define the deviation severity by outlining the potential impact (e.g. to the business) in case of exploitation. There are virtually unlimited ways to define the severity of a deviation; different approaches are suitable in different circumstances, and different organizations can use different approaches. FIG. 5 depicts one example of a process for classifying a compliance deviation, in accordance with aspects described herein. The process can be performed for each identified deviation, for instance each deviation identified by FIG. 4.

The process initializes with input of deviation information (502), such as a list of deviations, and proceeds by assigning several scores largely dictated by the organization and tailored to the organization's particular situation. The process assigns an importance score of the asset (504), a control name (506) and sub-control name (508) of the security policy, an impact to the confidentiality (510) and likelihood of impact to confidentiality (512), an impact to integrity (514) and likelihood of impact to integrity (516), an impact to availability (518) and likelihood of impact to availability (520). The process also assigns an expected exposure time (522). It is noted that each of these assignments are to follow a consistent criteria across deviations, to ensure consistent classification of the deviations. The process concludes by calculating a deviation score (524), for instance using a formula that weights the variables according to prior-assigned values.

The deviations found in the current system information, i.e. each deviation identified by FIG. 4, is given a final score that is calculated based on a weight-based classification. A deviation severity score is determined, indicative of a potential impact, such as a business impact, for example, of the compliance deviation. In some examples, the asset type (e.g. how critical the system is—production vs. development), the impact and likelihood of impact to the confidentiality, integrity and availability of the data stored in the system, etc. are taken into account, exclusively or in conjunction with other variables, in determining this score. The higher the score, the higher the severity of the deviation. In this manner, a deviation severity score for a compliance deviation is based at least in part on (i) an assigned importance of the system(s) of the deviation indicated by the compliance deviation, (ii) an assigned impact to confidentiality and likelihood of that impact occurring, (iii) an assigned impact to integrity of the one or more systems and likelihood of that impact occurring, and (iv) an exposure time resulting from the compliance deviation. The deviation severity score is determined, in some examples, as a weighted function of at least the assigned importance, assigned impact to confidentiality, assigned impact to integrity, and exposure time.

Figure 6:
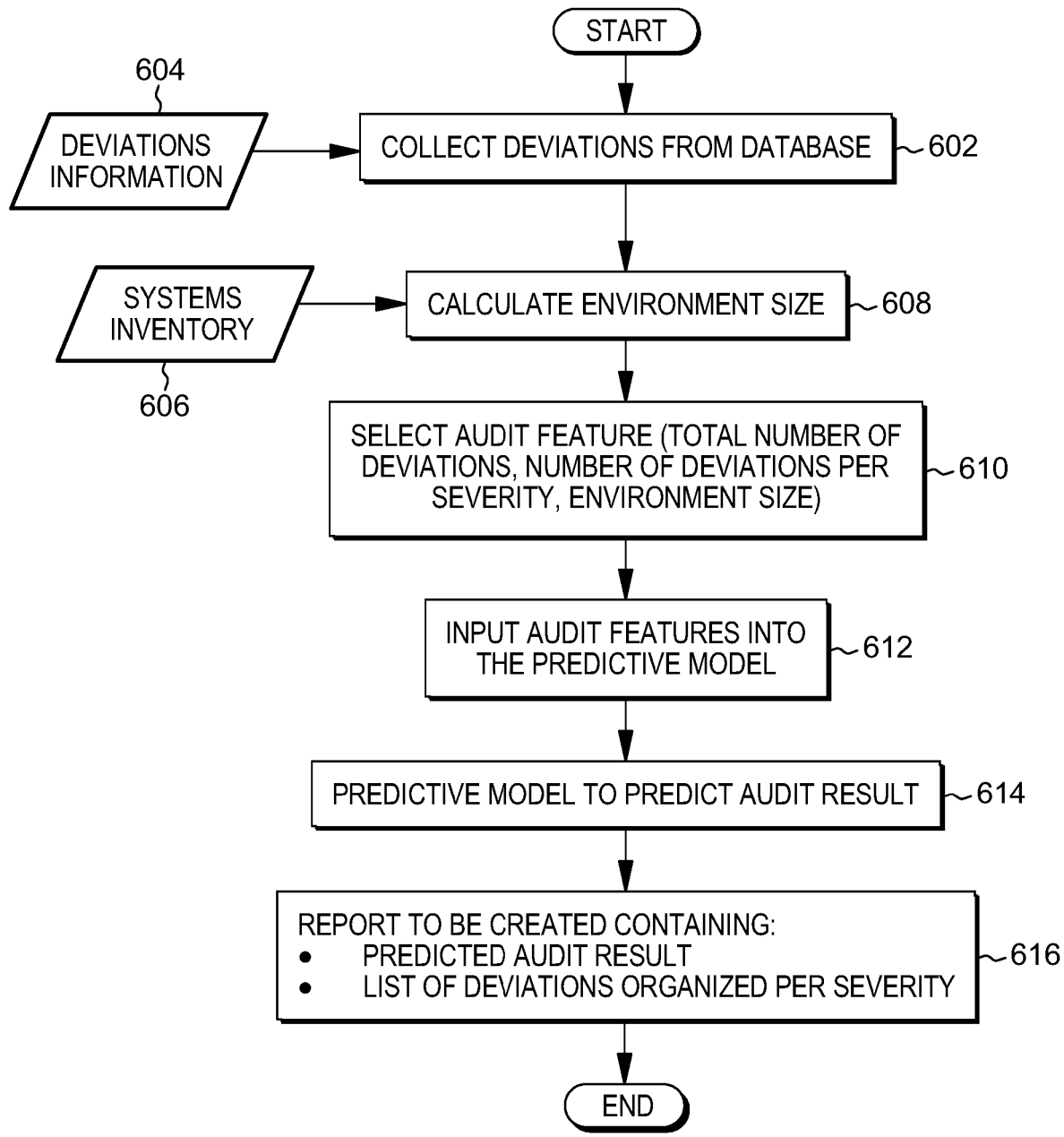
FIG. 6 depicts an example process for predicting an audit result using an audit result prediction model, in accordance with aspects described herein.

FIG. 6 depicts an example process for predicting an audit result using an audit result prediction model, in accordance with aspects described herein. This process defines the prediction phase of the method. Here, the information created in the previous processes is input to the audit results classification model (the predictive model), which outputs the expected audit result.

The process collects (602) the deviation information (604) from the database. The process calculates the environment size (608) by processing the system inventory details (606), and selects the audit features (610). Based on the determined compliance deviations, a set of audit features are selected. It is the selected features that are the basis on which a predicted audit result is to be generated. The set of features are the particular data that are fed into the model. In this particular example, the selected audit features are (i) the total number of deviations, (ii) the number of deviations for each severity level, and (iii) the environment size). The compliance deviations may be classified by deviation severity score into several different severity level classifications, where the selected set of audit features includes the total number of compliance deviations for the involved systems, a respective number of compliance deviations classified in each of the several severity level classifications, and an environment size of the involved systems. These audit features are input to the predictive model (612), which predicts the audit result (614), for instance SAT (satisfactory) or UNSAT (unsatisfactory). The predicted audit result is generated using the selected set of audit features as input to the audit result classification model, the audit result classification model having been trained on historical audit information to predict audit results based on input audit features. The predicted audit result is a prediction of a result of an audit of the systems, the result being, as examples, satisfactory, unsatisfactory, pass, or fail.

Additionally, the process generates and outputs (sends, displays, etc.) a graphical report indicating the predicted audit result and the list of deviations ordered by their severity (616).

Figure 7:
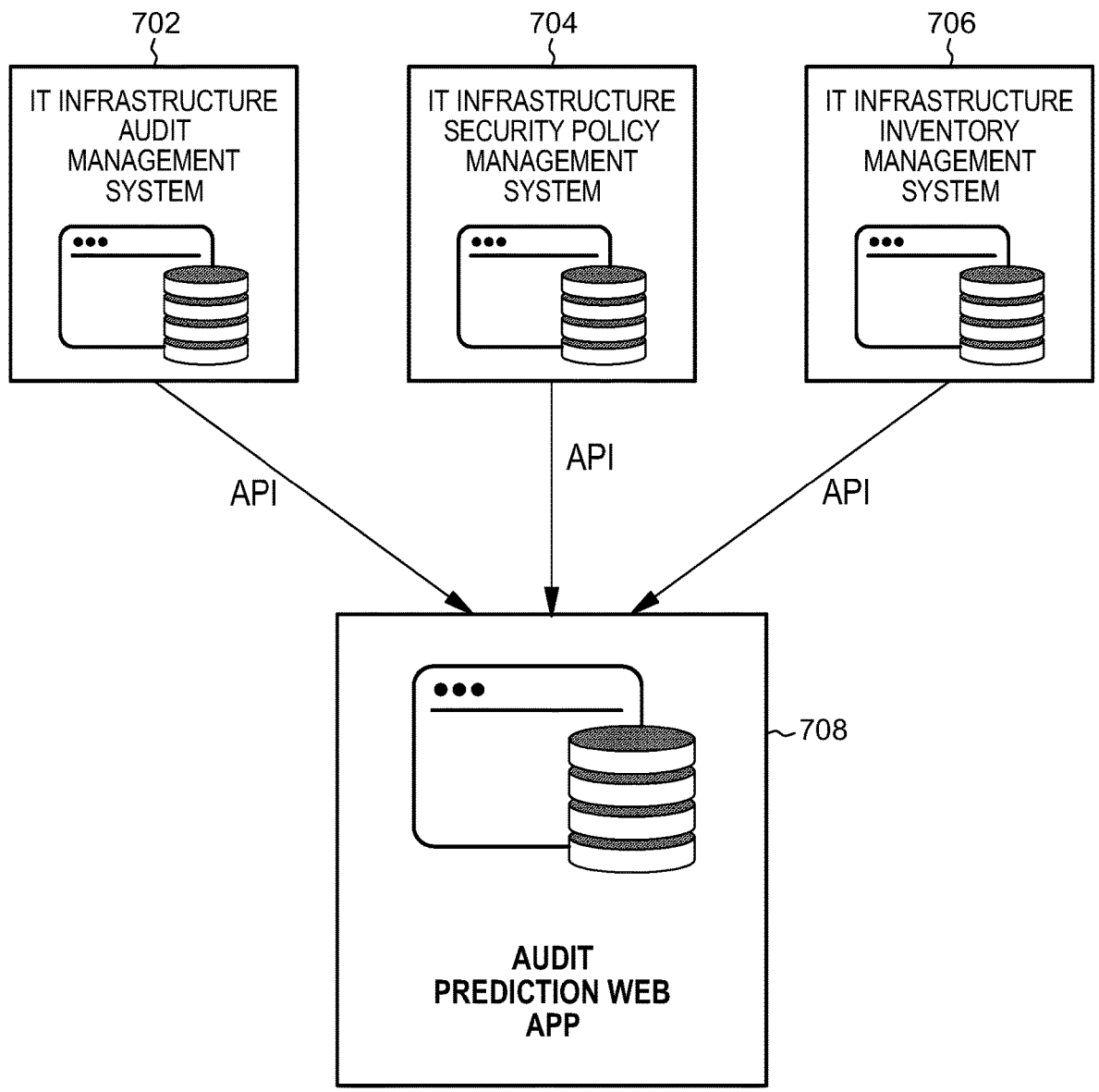
FIG. 7 depicts a conceptual overview of the integration between systems of a computer environment and an audit prediction web application, in accordance with aspects described herein.

By way of specific example, assume a use case involving a web application integrated to an organization's IT Inventory Management System, IT Infrastructure Security Policy Management System and IT Infrastructure Audit System. The overall details about each system and the integration between them is described below and with reference to FIG. 7, which depicts a conceptual overview of the integration between systems of a computer environment and an audit prediction web application, in accordance with aspects described herein.

IT Infrastructure Inventory Management System (706) is the system used to keep record and control of the IT Infrastructure Systems owned and managed by the organization. It has information related to the system type, model, owner, criticality, status and other configuration and details of each inventory item.

IT Infrastructure Security Policy Management System (704) is the system used as a digital repository of the current security policy requirements. It contains the detailed requirements for the different technologies used by the organization.

IT Infrastructure Audit Management System (702) is the system used as a repository for all of the previous audit results. It contains the data generated by the audits, including the findings details, the audit methodology, the audit results, and any other saved information.

Aspects described above proceed as two primary processes:

1—Audit Results Prediction Model training: The training of the audit result prediction model can be performed automatically without the end user intervention per specific triggers, for instance (i) every time a new audit is completed and saved in the IT Infrastructure Audit Management system (702), (ii) by a defined frequency: Daily, Weekly, Monthly, etc., and/or (iii) every time there is a new security policy requirement change. The training can additionally or alternatively be triggered manually by the end user, training may take a considerable amount of time depending on the size of the training data.

Figure 8:
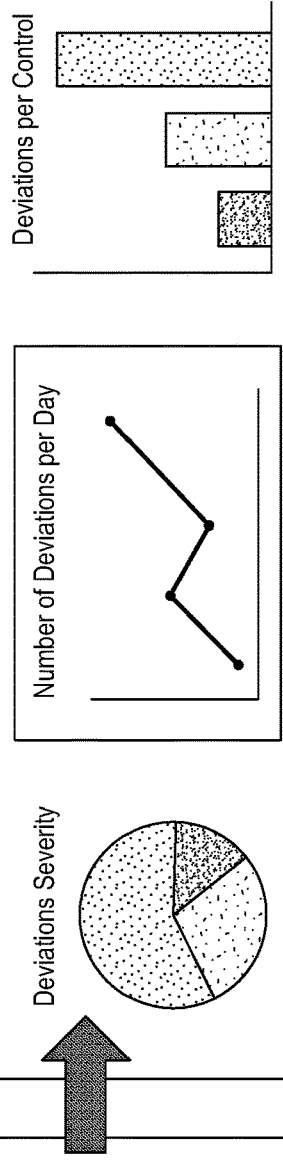
FIG. 8 depicts an example interface of an audit prediction web application, in accordance with aspects described herein.

2—Audit result prediction: This is described with reference to FIG. 8, which depicts an example interface of an audit prediction web application, in accordance with aspects described herein. In an example process, (i) The user logs in into the web application;
(ii) The user selects (in interface 802) the environment/account which would be the audit target;
(ii) If only a specific platform is to be audited, the user can select the specific platform, otherwise does not make a selection in this drop-down;
(iv) If there are multiple types of audits that could be applied to this environment, the user selects which audit standard the user wants the application to use in the evaluation, otherwise does not make a selection in this drop-down;
(v) the user requests the report generation (clicking the "Generate Report" button);
(vi) A report is shown (e.g. as interface 804) to the user, containing the predicted audit result and information related to the deviations found (if any).

Described herein are approaches that use machine learning against previous audit results in order to learn how to classify the severity of compliance deviations and to predict future audit results considering all deviations in place. This differs from other approaches, including an actual audit, which instead compares only the system configuration to the applicable security policy requirements. A regular audit is focused exclusively on a determination of present compliance based on rules. In contrast, aspects described herein focus on predicting an audit result by learning the historical evaluation of audit risk, how it contributes to audit results, and which audit features are the most relevant based on historical results, to predict what an audit result is expected to be.

Figure 9:
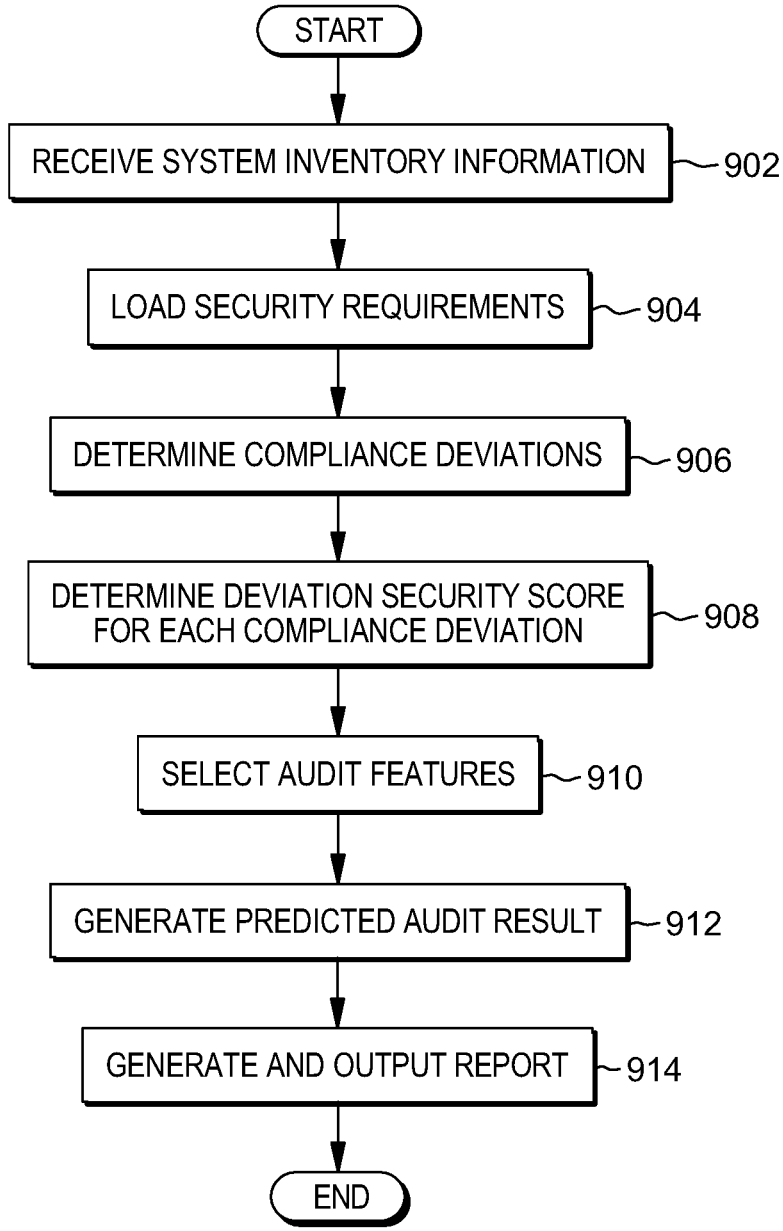
FIG. 9 depicts an example process for computer environment infrastructure compliance audit result prediction, in accordance with aspects described herein.

FIG. 9 depicts an example process for computer environment infrastructure compliance audit result prediction, in accordance with aspects described herein. In some examples, the process is performed by one or more computer systems, such as those described herein.

The process begins by receiving system inventory information identifying a plurality of systems of a computer environment and properties of the plurality of systems (902). The plurality of systems are targeted for audit result prediction. The properties of the plurality of systems includes, as examples, for each system, a system type and version. The process also loads security requirements applicable to the plurality of systems (904). The loaded security requirements can include one or more security policies indicating proper values and configurations for the plurality of systems.

The process determines compliance deviations based on the received system inventory information and the loaded security requirements (906). Each compliance deviation of the compliance deviations indicates a deviation between a current configuration of a respective one or more systems of the plurality of systems and a respective security requirement, of the security requirements, applicable to the one or more systems.

For each compliance deviation of the determined compliance deviations, the process determines a deviation severity score indicative of a potential impact of the compliance deviation (908). A deviation severity score for a compliance deviation can be based at least in part on an assigned importance of the one or more systems of the deviation indicated by the compliance deviation, an assigned impact to confidentiality and likelihood of that impact occurring, an assigned impact to integrity of the one or more systems and likelihood of that impact occurring, and/or an exposure time resulting from the compliance deviation. In particular, the deviation severity score can be determined as a weighted function of at least the assigned importance, assigned impact to confidentiality, assigned impact to integrity, and exposure time.

Based at least on the determined compliance deviations, the process selects a set of audit features based on which a predicted audit result is to be generated (910). The selected set of features may be based on a respective deviation severity score for each compliance deviation. The compliance deviations may be classified by deviation severity score into a plurality of severity level classifications, where the selected set of audit features includes a total number of compliance deviations for the plurality of systems, a respective number of compliance deviations classified in each of the plurality of severity level classifications, and an environment size of the plurality of systems.

The process generates the predicted audit result using the selected set of audit features as input to an audit result classification model (912). The audit result classification model may be trained on historical audit information to predict audit results based on input audit features. The predicted audit result is a prediction of a result of an audit of the plurality of systems. For instance, the predicted result is one selected from the group consisting of: satisfactory, unsatisfactory, pass, or fail.

Additionally, the process generates and outputs a report displaying the predicted audit result and a list of compliance deviations organized based on deviation severity score (914). In one example, the outputting is sending the report to a computer system of an end user. Additionally or alternatively, the outputting comprises displaying the report to the end user via a web interface.

As noted, the audit result classification model is built using a machine learning algorithm. For instance, the building can include retrieving the historical audit information, and selecting from the historical audit information, for each audit represented in the historical audit information, at least the following features: an audit result, number of compliance deviations, severity of each of the compliance deviations, and environment size. Additionally or alternatively, the selected features include, for each audit represented: a size of samples used by auditors during the audit, a name of an environment subject to the audit, a date when the audit was performed, and/or a type of the audit. The selected features may be partitioned into a training dataset and a test dataset, and the training dataset may be input into a learning algorithm that performs classification on the training dataset. The classification can include extracting features indicative of audit results, and generating the audit result classification model based on the inputting. The model may thereafter be validated using the test data, for instance. This provides the trained model that can used for audit result prediction as described herein.

Although various examples are provided, variations are possible without departing from a spirit of the claimed aspects.

Figure 10:
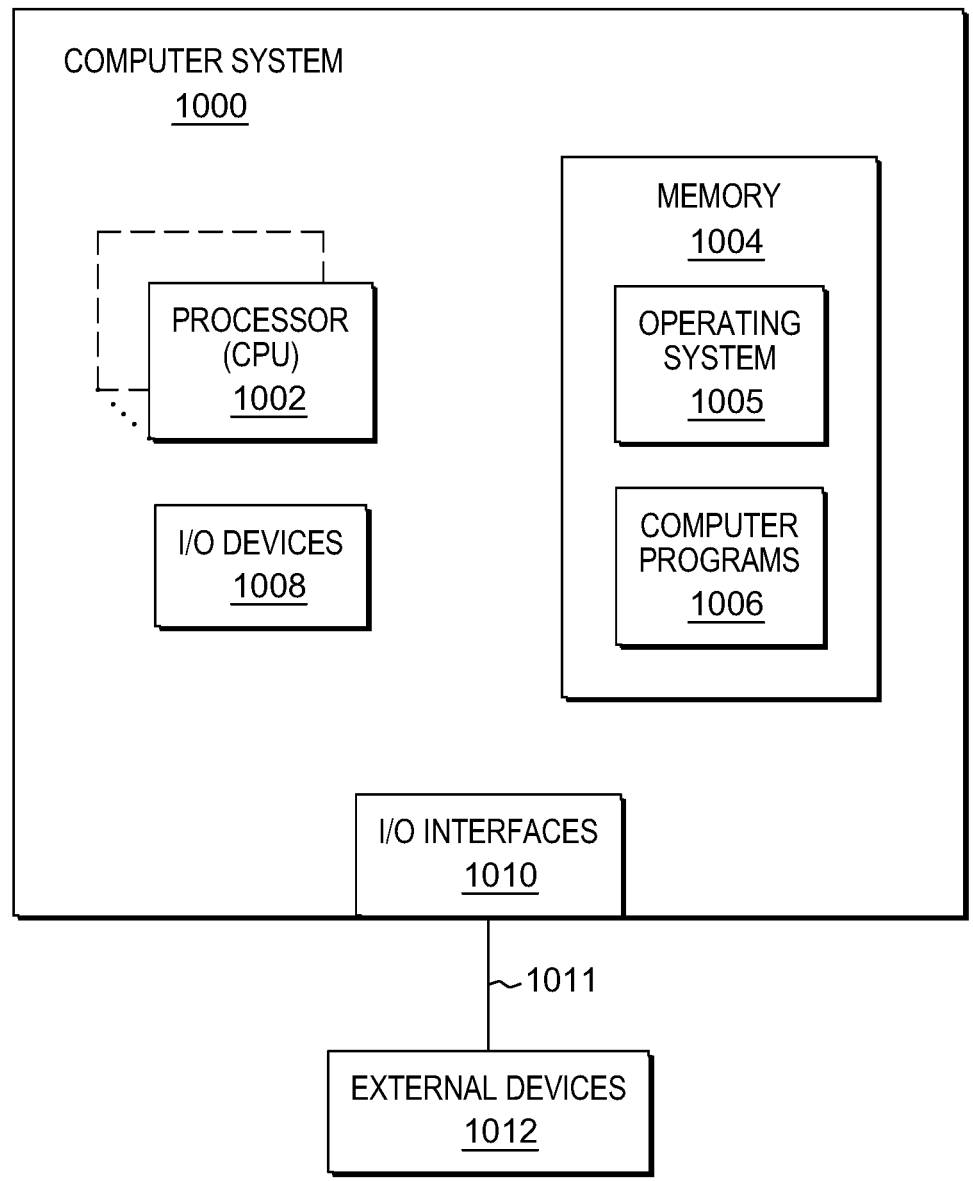
FIG. 10 depicts one example of a computer system and associated devices to incorporate and/or use aspects described herein.

Processes described herein may be performed singly or collectively by one or more computer systems. FIG. 10 depicts one example of such a computer system and associated devices to incorporate and/or use aspects described herein. A computer system may also be referred to herein as a data processing device/system, computing device/system/node, or simply a computer. The computer system may be based on one or more of various system architectures and/or instruction set architectures, such as those offered by International Business Machines Corporation (Armonk, N.Y., USA), Intel Corporation (Santa Clara, Calif., USA) or ARM Holdings plc (Cambridge, England, United Kingdom), as examples.

FIG. 10 shows a computer system 1000 in communication with external device(s) 1012. Computer system 1000 includes one or more processor(s) 1002, for instance central processing unit(s) (CPUs). A processor can include functional components used in the execution of instructions, such as functional components to fetch program instructions from locations such as cache or main memory, decode program instructions, and execute program instructions, access memory for instruction execution, and write results of the executed instructions. A processor 1002 can also include register(s) to be used by one or more of the functional components. Computer system 1000 also includes memory 1004, input/output (I/O) devices 1008, and I/O interfaces 1010, which may be coupled to processor(s) 1002 and each other via one or more buses and/or other connections. Bus connections represent one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 1004 can be or include main or system memory (e.g. Random Access Memory) used in the execution of program instructions, storage device(s) such as hard drive(s), flash media, or optical media as examples, and/or cache memory, as examples. Memory 1004 can include, for instance, a cache, such as a shared cache, which may be coupled to local caches (examples include L1 cache, L2 cache, etc.) of processor(s) 1002. Additionally, memory 1004 may be or include at least one computer program product having a set (e.g., at least one) of program modules, instructions, code or the like that is/are configured to carry out functions of embodiments described herein when executed by one or more processors.

Memory 1004 can store an operating system 1005 and other computer programs 1006, such as one or more computer programs/applications that execute to perform aspects described herein. Specifically, programs/applications can include computer readable program instructions that may be configured to carry out functions of embodiments of aspects described herein.

Examples of I/O devices 1008 include but are not limited to microphones, speakers, Global Positioning System (GPS) devices, cameras, lights, accelerometers, gyroscopes, magnetometers, sensor devices configured to sense light, proximity, heart rate, body and/or ambient temperature, blood pressure, and/or skin resistance, and activity monitors. An I/O device may be incorporated into the computer system as shown, though in some embodiments an I/O device may be regarded as an external device (1012) coupled to the computer system through one or more I/O interfaces 1010.

Computer system 1000 may communicate with one or more external devices 1012 via one or more I/O interfaces 1010. Example external devices include a keyboard, a pointing device, a display, and/or any other devices that enable a user to interact with computer system 1000. Other example external devices include any device that enables computer system 1000 to communicate with one or more other computing systems or peripheral devices such as a printer. A network interface/adapter is an example I/O interface that enables computer system 1000 to communicate with one or more networks, such as a local area network (LAN), a general wide area network (WAN), and/or a public network (e.g., the Internet), providing communication with other computing devices or systems, storage devices, or the like. Ethernet-based (such as Wi-Fi) interfaces and Bluetooth® adapters are just examples of the currently available types of network adapters used in computer systems (BLUETOOTH is a registered trademark of Bluetooth SIG, Inc., Kirkland, Wash., U.S.A.).

The communication between I/O interfaces 1010 and external devices 1012 can occur across wired and/or wireless communications link(s) 1011, such as Ethernet-based wired or wireless connections. Example wireless connections include cellular, Wi-Fi, Bluetooth®, proximity-based, near-field, or other types of wireless connections. More generally, communications link(s) 1011 may be any appropriate wireless and/or wired communication link(s) for communicating data.

Particular external device(s) 1012 may include one or more data storage devices, which may store one or more programs, one or more computer readable program instructions, and/or data, etc. Computer system 1000 may include and/or be coupled to and in communication with (e.g. as an external device of the computer system) removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media.

Computer system 1000 may be operational with numerous other general purpose or special purpose computing system environments or configurations. Computer system 1000 may take any of various forms, well-known examples of which include, but are not limited to, personal computer (PC) system(s), server computer system(s), such as messaging server(s), thin client(s), thick client(s), workstation(s), laptop(s), handheld device(s), mobile device(s)/computer(s) such as smartphone(s), tablet(s), and wearable device(s), multiprocessor system(s), microprocessor-based system(s), telephony device(s), network appliance(s) (such as edge appliance(s)), virtualization device(s), storage controller(s), set top box(es), programmable consumer electronic(s), network PC(s), minicomputer system(s), mainframe computer system(s), and distributed cloud computing environment(s) that include any of the above systems or devices, and the like.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
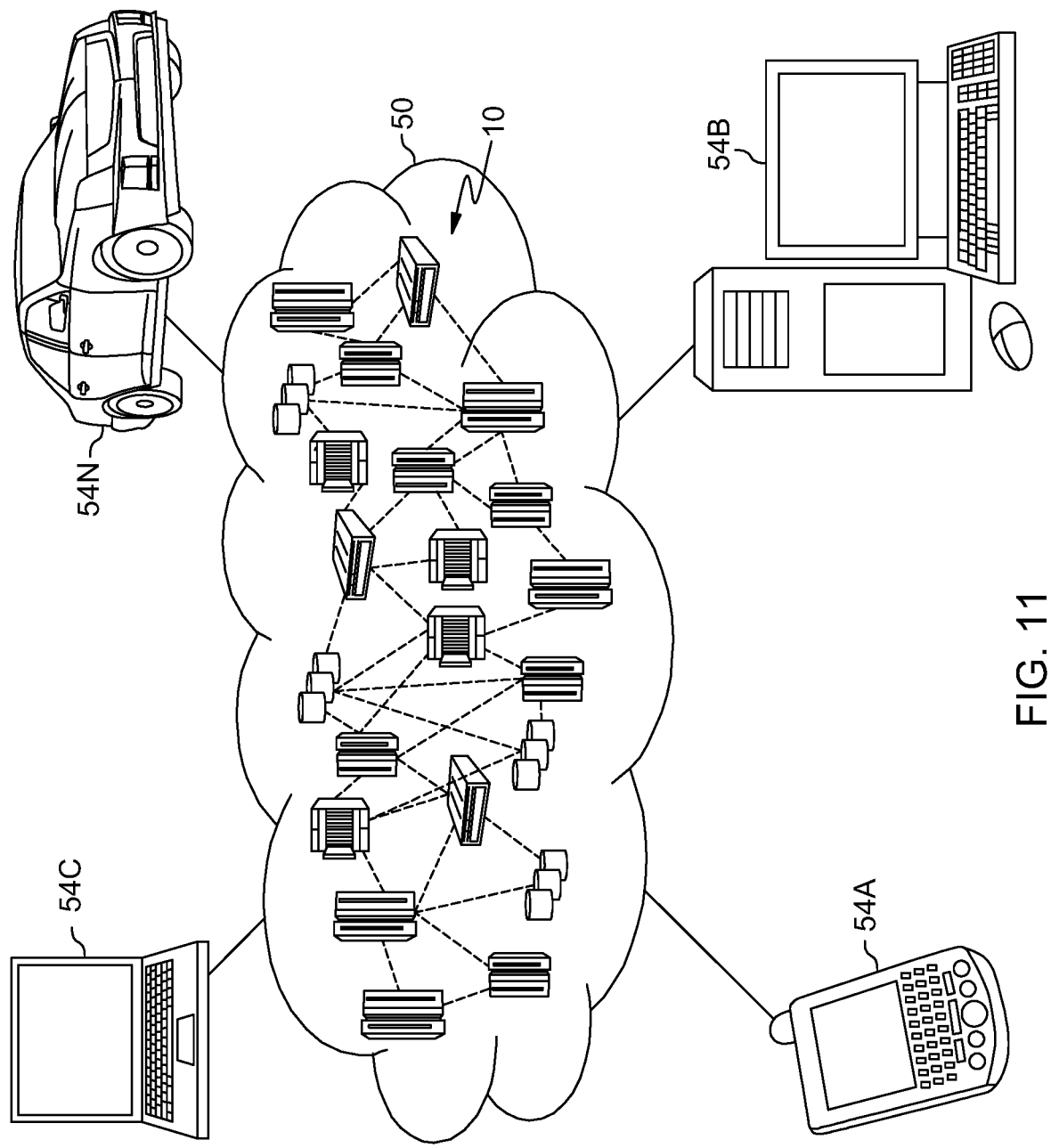
FIG. 11 depicts a cloud computing environment according to an embodiment of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
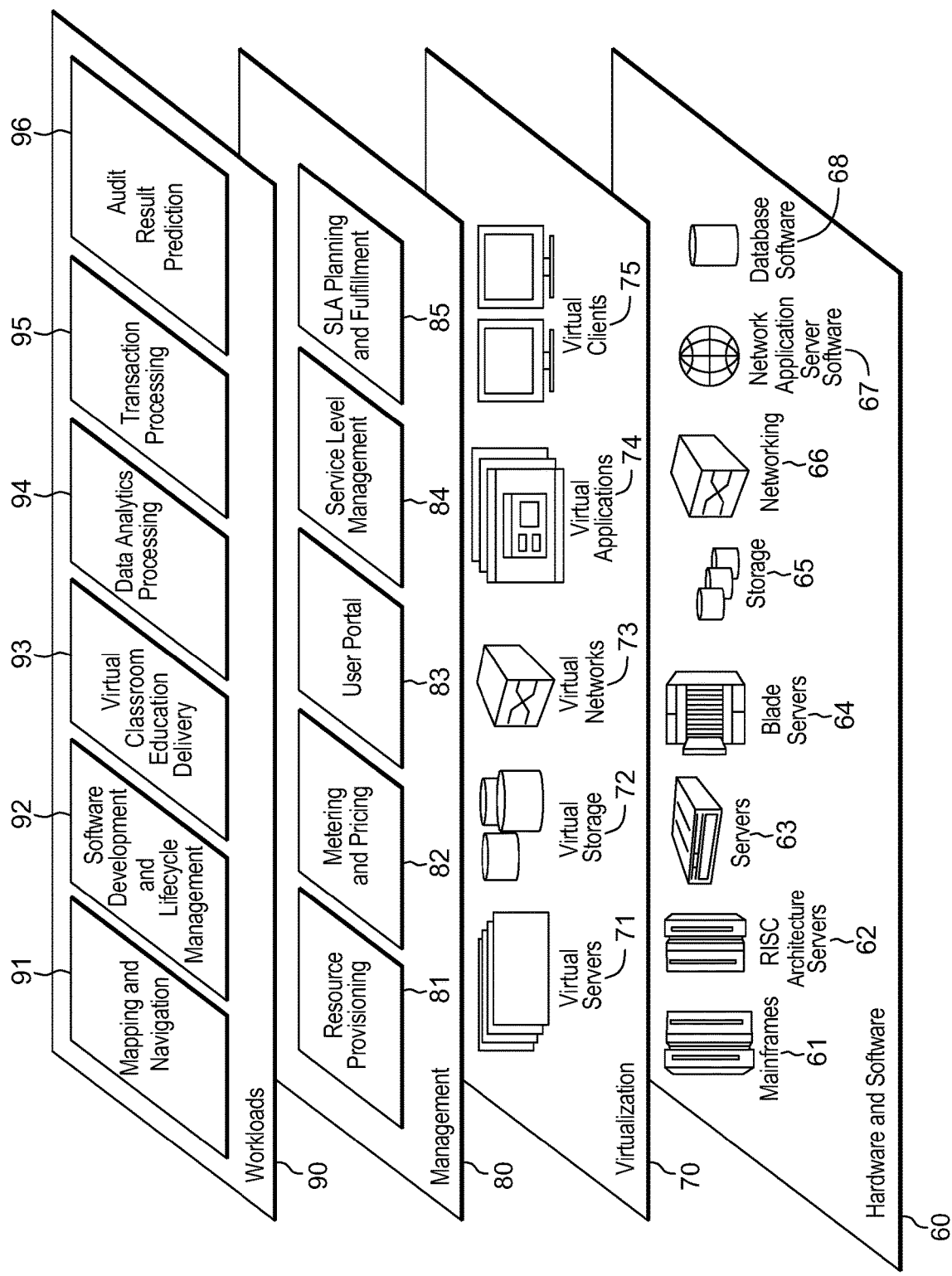
FIG. 12 depicts abstraction model layers according to an embodiment of the present invention.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audit result prediction 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally, or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method comprising:
receiving system inventory information identifying a plurality of systems of a computer environment and properties of the plurality of systems, the plurality of systems being targeted for audit result prediction;
loading security requirements applicable to the plurality of systems;
determining compliance deviations based on the received system inventory information and the loaded security requirements, each compliance deviation of the compliance deviations indicating a deviation between a current configuration of a respective one or more systems of the plurality of systems and a respective security requirement, of the security requirements, applicable to the one or more systems;

based at least on the determined compliance deviations, selecting a set of audit features based on which a predicted audit result is to be generated; and generating a predicted audit result using the selected set of audit features as input to an audit result classification model, the audit result classification model trained on historical audit information to predict audit results based on input audit features, and the predicted audit result being a prediction of a result of an audit of the plurality of systems.

2. The method of claim 1, further comprising, for each compliance deviation of the determined compliance deviations, determining a deviation severity score indicative of a potential impact of the compliance deviation, wherein the selected set of features input to the audit result classification model is based on the respective deviation severity score for each compliance deviation.

3. The method of claim 2, wherein a deviation severity score for a compliance deviation is based at least in part on an assigned importance of the one or more systems of the deviation indicated by the compliance deviation, an assigned impact to confidentiality and likelihood of that impact occurring, an assigned impact to integrity of the one or more systems and likelihood of that impact occurring, and an exposure time resulting from the compliance deviation.

4. The method of claim 3, wherein the deviation severity score is determined as a weighted function of at least the assigned importance, assigned impact to confidentiality, assigned impact to integrity, and exposure time.

5. The method of claim 2, further comprising classifying the compliance deviations by deviation severity score into a plurality of severity level classifications, wherein the selected set of audit features comprise a total number of compliance deviations for the plurality of systems, a respective number of compliance deviations classified in each of the plurality of severity level classifications, and an environment size of the plurality of systems.

6. The method of claim 1, further comprising building the audit result classification model using a machine learning algorithm, the building comprising:
retrieving the historical audit information;
selecting from the historical audit information, for each audit represented in the historical audit information, at least the following features: an audit result, number of compliance deviations, severity of each of the compliance deviations, and environment size;
partitioning the selected features into a training dataset and a test dataset;
inputting the training dataset into a learning algorithm that performs classification on the training dataset, the classification comprising extracting features indicative of audit results, and generating the audit result classification model based on the inputting.

7. The method of claim 6, wherein the selected features further include, for each audit represented: a size of samples used by auditors during the audit, a date when the audit was performed, and a type of the audit.

8. The method of claim 1, further comprising generating and outputting a report displaying the predicted audit result and a list of compliance deviations organized based on deviation severity score.

9. The method of claim 1, wherein the loaded security requirements comprise one or more security policies indicating proper values and configurations for the plurality of systems.

10. The method of claim 1, wherein the properties of the plurality of systems comprise a system type and version of each system of the plurality of systems.

11. The method of claim 1, wherein the predicted result is one selected from the group consisting of: satisfactory, unsatisfactory, pass, or fail.

12. A computer system comprising:
a memory; and
a processor in communication with the memory, wherein the computer system is configured to perform a method comprising:
receiving system inventory information identifying a plurality of systems of a computer environment and properties of the plurality of systems, the plurality of systems being targeted for audit result prediction;
loading security requirements applicable to the plurality of systems;
determining compliance deviations based on the received system inventory information and the loaded security requirements, each compliance deviation of the compliance deviations indicating a deviation between a current configuration of a respective one or more systems of the plurality of systems and a respective security requirement, of the security requirements, applicable to the one or more systems;
based at least on the determined compliance deviations, selecting a set of audit features based on which a predicted audit result is to be generated; and
generating a predicted audit result using the selected set of audit features as input to an audit result classification model, the audit result classification model trained on historical audit information to predict audit results based on input audit features, and the predicted audit result being a prediction of a result of an audit of the plurality of systems.

13. The computer system of claim 12, wherein the method further comprises, for each compliance deviation of the determined compliance deviations, determining a deviation severity score indicative of a potential impact of the compliance deviation, wherein the selected set of features input to the audit result classification model is based on the respective deviation severity score for each compliance deviation.

14. The computer system of claim 13, wherein a deviation severity score for a compliance deviation is based at least in part on an assigned importance of the one or more systems of the deviation indicated by the compliance deviation, an assigned impact to confidentiality and likelihood of that impact occurring, an assigned impact to integrity of the one or more systems and likelihood of that impact occurring, and an exposure time resulting from the compliance deviation.

15. The computer system of claim 13, wherein the method further comprises classifying the compliance deviations by deviation severity score into a plurality of severity level classifications, wherein the selected set of audit features comprise a total number of compliance deviations for the plurality of systems, a respective number of compliance deviations classified in each of the plurality of severity level classifications, and an environment size of the plurality of systems.

16. The computer system of claim 12, wherein the method further comprises building the audit result classification model using a machine learning algorithm, the building comprising:

retrieving the historical audit information;

selecting from the historical audit information, for each audit represented in the historical audit information, at least the following features: an audit result, number of compliance deviations, severity of each of the compliance deviations, environment size, and a size of samples used by auditors during the audit.

partitioning the selected features into a training dataset and a test dataset;

inputting the training dataset into a learning algorithm that performs classification on the training dataset, the classification comprising extracting features indicative of audit results, and generating the audit result classification model based on the inputting.

17. A computer program product comprising:
a computer readable storage medium readable by a processing circuit and storing instructions for execution by the processing circuit for performing a method comprising:

receiving system inventory information identifying a plurality of systems of a computer environment and properties of the plurality of systems, the plurality of systems being targeted for audit result prediction;

loading security requirements applicable to the plurality of systems;

determining compliance deviations based on the received system inventory information and the loaded security requirements, each compliance deviation of the compliance deviations indicating a deviation between a current configuration of a respective one or more systems of the plurality of systems and a respective security requirement, of the security requirements, applicable to the one or more systems;

based at least on the determined compliance deviations, selecting a set of audit features based on which a predicted audit result is to be generated; and generating a predicted audit result using the selected set of audit features as input to an audit result classification model, the audit result classification model trained on historical audit information to predict audit results based on input audit features, and the predicted audit result being a prediction of a result of an audit of the plurality of systems.

18. The computer program product of claim 17, wherein the method further comprises, for each compliance deviation of the determined compliance deviations, determining a deviation severity score indicative of a potential impact of the compliance deviation, wherein the selected set of features input to the audit result classification model is based on the respective deviation severity score for each compliance deviation.

19. The computer program product of claim 18, wherein a deviation severity score for a compliance deviation is based at least in part on an assigned importance of the one or more systems of the deviation indicated by the compliance deviation, an assigned impact to confidentiality and likelihood of that impact occurring, an assigned impact to integrity of the one or more systems and likelihood of that impact occurring, and an exposure time resulting from the compliance deviation.

20. The computer program product of claim 18, wherein the method further comprises classifying the compliance deviations by deviation severity score into a plurality of severity level classifications, wherein the selected set of audit features comprise a total number of compliance deviations for the plurality of systems, a respective number of compliance deviations classified in each of the plurality of severity level classifications, and an environment size of the plurality of systems.

* * * * *